(12) United States Patent
Bancalari (10) Patent No.: US 8,615,318 B2
(45) Date of Patent: Dec. 24, 2013

(54) PROCESS CONTROL OF TOLERANCE RINGS

(75) Inventor: Gino Bancalari, Bristol (GB)

(73) Assignee: Saint-Gobain Performance Plastics Rencol Limited, Bristol (GB)

(*) Notice: Subject to any disclaimer, the term of this patent is extended or adjusted under 35 U.S.C. 154(b) by 843 days.

(21) Appl. No.: 12/624,817

(22) Filed: Nov. 24, 2009

(65) Prior Publication Data
US 2010/0138005 A1    Jun. 3, 2010

(30) Foreign Application Priority Data

Nov. 25, 2008 (GB) .................................. 0821535.2

(51) Int. Cl.
*G11B 5/127* (2006.01)

(52) U.S. Cl.
USPC ................ 700/109; 700/117; 29/603.03

(58) Field of Classification Search
USPC .......................................... 700/33, 245, 260
See application file for complete search history.

(56) References Cited

U.S. PATENT DOCUMENTS

| | | | |
|---|---|---|---|
| 4,349,205 A * | 9/1982 | McGee et al. ................ 277/564 |
| 4,402,535 A * | 9/1983 | Bridges .................... 285/123.11 |
| 5,602,698 A * | 2/1997 | Miyazaki et al. ......... 360/244.6 |
| 6,191,513 B1 * | 2/2001 | Chen et al. ...................... 310/90 |
| 6,333,839 B1 | 12/2001 | Misso et al. |
| 6,394,690 B1 * | 5/2002 | Bartholoma et al. ......... 403/290 |
| 6,596,949 B2 * | 7/2003 | Stimpson ...................... 177/142 |
| 6,704,995 B2 * | 3/2004 | Toensing et al. ........... 29/603.03 |
| 6,859,996 B1 * | 3/2005 | Slife et al. .................. 29/603.03 |
| 7,007,386 B1 * | 3/2006 | Stover ......................... 29/898.07 |
| 7,562,434 B2 * | 7/2009 | Ishikawa et al. ........... 29/603.03 |
| 7,840,297 B1 * | 11/2010 | Tuszynski ..................... 700/108 |
| 7,918,007 B2 * | 4/2011 | Watanabe et al. ............... 29/509 |
| 7,922,418 B2 * | 4/2011 | Baker et al. ................... 403/372 |
| 7,957,103 B2 * | 6/2011 | Woodhead et al. ........ 360/265.2 |
| 8,458,896 B2 * | 6/2013 | Chandrasekaran et al. .... 29/739 |

(Continued)

FOREIGN PATENT DOCUMENTS

DE   102006033338 A1   1/2008
EP      1961979 A2      8/2008

(Continued)

OTHER PUBLICATIONS

"Less Stress Quality Assurance" by Pantek Ltd <http://www.wonderware.fi/pdf/Success_Stories/Metals_Minerals_Mining/Wonderware_sstory_MMM_Rencol_en_0706.pdf> Jul. 18, 2006.*

*Primary Examiner* — Ryan Jarrett
*Assistant Examiner* — Michael J. Scapin
(74) *Attorney, Agent, or Firm* — Abel Law Group, LLP; Chi Suk Kim (57) ABSTRACT

A method of process control including constraining a tolerance ring relative to one of an inner and an outer component. The tolerance ring including an annular band of resilient material having a plurality of projections projecting radially therefrom. Additionally, the method includes moving the other of the inner or outer component with respect to the constrained tolerance ring so as to compress the projections of the tolerance ring between the inner and outer components, and continuing movement of the inner or outer component, respectively, beyond the projections. The method further including measuring a force required for continuing movement, and using the force for process control.

7 Claims, 6 Drawing Sheets

(56) References Cited

U.S. PATENT DOCUMENTS

| | | |
|---|---|---|
| 2002/0148104 A1 | 10/2002 | Slife et al. |
| 2005/0072204 A1 | 4/2005 | Maze et al. |
| 2006/0228174 A1* | 10/2006 | Woodhead et al. ........... 403/371 |
| 2007/0050068 A1* | 3/2007 | Sakairi ............................ 700/98 |
| 2008/0151423 A1* | 6/2008 | Ueda ........................ 360/119.01 |
| 2008/0267693 A1* | 10/2008 | Court et al. .................... 403/14 |

FOREIGN PATENT DOCUMENTS

| | | |
|---|---|---|
| JP | 05-042427 A | 2/1993 |
| JP | 09-300181 A | 11/1997 |
| JP | 2003-518592 A | 6/2003 |
| JP | 2008-084306 A | 4/2008 |
| WO | 2005/032741 A | 4/2005 |

\* cited by examiner

PROCESS CONTROL OF TOLERANCE RINGS

CROSS-REFERENCE TO RELATED APPLICATION(S)

The present application claims priority from GB Application No. 0821535.2, filed Nov. 25, 2008, entitled "Process Control of Tolerance Rings," naming inventor Gino Bancalarli, which application is incorporated by reference herein in its entirety.

FIELD OF THE DISCLOSURE

The disclosure relates to process control of tolerance rings for mounting between mating inner and outer components.

BACKGROUND

It is known to connect together mating inner and outer components using a tolerance ring. One example of the use of a tolerance ring is in a hard disk drive (HDD) pivot mount, where the tolerance ring is sandwiched between, and provides axial retention between, a bearing housing and a bore in the head actuator arm. The use of a tolerance ring enables the manufacturing tolerances for the mating components to be relaxed, reduces assembly time, enables easy disassembly for re-work, and can improve resonance performance.

It is important that the fit between the mating components is sufficient to ensure that there is no axial, i.e. linear, slip between them during operation. It is therefore desirable to monitor manufactured tolerance rings to ensure that the force (known as initial slip force) at which linear slip occurs between the mating components between which it is to be assembled is within acceptable parameters.

SUMMARY

One method for determining initial slip force measures the peak force (known as peak assembly force) required to move a plug gauge within a pre-assembly of a tolerance ring and a ring gauge. A sample of manufactured tolerance rings is tested in this way and, if the peak assembly force is determined to be outside acceptable margins, the manufacturing process is adapted to compensate so that subsequently-produced tolerance rings provide peak assembly forces within acceptable margins.

However, the peak assembly force can be influenced by features of the assembly such as elastic deformation, plastic deformation, roughness and out-of-shape effects, none of which influence axial slip force. For example, it has been found that a peak in assembly force can occur when the head of the plug gauge initially contacts a projecting ridge of a tolerance ring and energy is required to deform the ridge to enable the gauge to slide over it. This effect is not experienced when the tolerance ring is assembled and in use, and so it is unrelated to initial slip force. It has also been found that peak assembly force is affected by pre-assembly surface treatment steps such as passivation. Since it is preferable to apply process control measures to tolerance rings before surface treatment to ensure that errors in the process are detected as quickly as possible, the effect of surface treatment steps on the peak assembly force measure is undesirable. Accordingly, the peak assembly force does not give a true representation of initial slip force, and is therefore unreliable.

The assembly force can become substantially constant once a gauge moving relative to a constrained tolerance ring passes beyond the projections of that tolerance ring. This measured force, which may be referred to as remaining assembly force, has a much stronger correlation with initial slip force than peak assembly force. It is also far less influenced by surface treatment steps such as passivation.

In an embodiment, a process control method in which an inner or outer component is moved relative to a constrained tolerance ring so that the moving component passes beyond the projections of the tolerance ring, and measuring the force required to achieve this movement.

More particularly, in a first aspect, a method of process control including the steps of:

(a) constraining a tolerance ring relative to one of an inner and an outer component, the tolerance ring comprising an annular band of resilient material having a plurality of projections projecting radially therefrom;

(b) moving the other of the inner or outer component with respect to the constrained tolerance ring so as to compress the projections of the tolerance ring between the inner and outer components;

(c) continuing movement of the inner or outer component, respectively, beyond the projections;

(d) measuring a force required to achieve the continued movement at step (c); and (e) using the force measured at step (d) for process control.

In the prior method discussed above, the plug gauge is passed through a tolerance ring constrained within the ring gauge so that the leading edge, i.e. the advancing edge, of the ring contact surface travels from one side of the tolerance ring to the other. The maximum force (peak assembly force) required to achieve this movement is measured and is taken to be representative of the initial slip force.

In the first aspect, however, the assembly force required to continue movement of the moving component (inner or outer component) beyond the projections of a constrained tolerance ring is measured and used in process control. The process control may be process control of a method of manufacturing tolerance rings, the constrained tolerance ring being a sample tolerance ring manufactured according to that manufacturing method. The process control may be statistical process control, and the method may include performing statistical analysis on the force measured at step (d). For example, the method may include the step of compiling a process control chart including the force measured at step (d). Steps (a) to (d) of the process control method may be carried out for each of a plurality of sample tolerance rings, and step (e) may include using the forces measured at step (d) for each of those tolerance rings for process control.

The force measured at step (d) is typically the force required to achieve the continued movement at a constant speed. The continued movement is preferably movement along a predetermined distance. The force measured at step (d) may alternatively be the force required to achieve the continued movement according to a predetermined variable speed profile.

The force measured at step (d) may be used to determine whether the tested tolerance ring will deliver acceptable resistance to linear (i.e. axial, rather than rotational) slip between the mating components between which it is assembled. If the resistance to slip is not acceptable then changes may be made to the manufacturing process to ensure that subsequently produced tolerance rings do provide acceptable slip resistance.

The resistance to slip may be represented by the initial slip force, which is the resultant axial force which must be applied to the mating inner and outer components to generate slip between them. If the initial slip force is too low the components may separate during use; if it is too high assembly/disassembly will be difficult. It is therefore desirable that this parameter is controlled.

The method may include determining an assembly force (remaining assembly force) from the measured force data and using this assembly force for process control. In particular, the process control may include using a predetermined correlation between assembly force and initial slip force to determine whether the assembly force corresponds to an initial slip force within predetermined limits.

The measured force has been found to be approximately constant when the moving component has traveled beyond the projections, i.e. during the continued movement step. The method may include determining the assembly force (remaining assembly force) by calculating an average, or best-fit, force from the force data. For example, the force data may be represented in the form of a graph and the assembly force determined from a best-fit line generated for the portion of the graph representing the force data from step (c). Alternatively, the method may include taking a single force measurement at step (c) and this force taken to be the assembly force.

The correlation between assembly force (remaining assembly force) and initial slip force may be determined based on empirical data obtained by experiment. For example, a sample of tolerance rings may be tested to determine both the assembly force (by the above method) and initial slip force (by known methods), and the resulting data used to establish a relationship between the two parameters.

In the first aspect, after the moving component has encountered the projections of the tolerance ring, it continues to travel so that it protrudes beyond the projections. In the continued movement, the moving component may protrude beyond all of the projections. For example, in cases where the tolerance ring has a plurality of rows of projections, the moving component may continue to travel so that it protrudes beyond all the rows of projections, i.e. beyond the final row of projections encountered in the direction of travel. The extent of travel of the moving component may be determined by the leading edge of the mating surface of that component, i.e. the part of the inner or outer component that first contacts the projections during relative movement. That is, step (c) may include continuing movement of the inner or outer component, respectively, so that the leading edge of the mating surface of that component protrudes beyond the projections, i.e. so that the axial position of the leading edge is beyond the projections in the direction of travel. The mating surface of the moving component is the inner surface (outer component) or outer surface (inner component) which contacts the tolerance ring during compression of its projections.

The tolerance ring may comprise a band or strip of resilient material, e.g. a metal such as spring steel, the ends of which have been brought towards one another to form a ring. The ends of the strip may be separated by a gap, may meet one another, or may overlap. The projections may be arranged in one or more rows (lines) along the strip of material to form circumferential series when the strip is curved into an annular band. They may extend either outwardly from the ring or inwardly towards the centre of the ring. The projections may be press-formed or roll-formed. They may be formations, possibly regular formations, such as corrugations, ridges, waves or fingers. The non-formed regions of the band may be referred to as unformed regions. In embodiments with one circumferential row of projections the tolerance ring may include two annular unformed regions, one between the row of projections and each of the edges of the tolerance ring. In embodiments with a plurality of circumferential rows of projections the tolerance ring may include an annular unformed region between each row of projections and between each outermost row and the adjacent edge of the tolerance ring.

In the process control method, the tolerance ring is located in the annular space between the inner and outer components such that the projections are compressed between the mating surfaces of those components. In embodiments in which all of the projections extend outwardly the mating surface of the outer component abuts the projections and the mating surface of the inner component abuts the unformed regions. Alternatively, in embodiments in which all of the projections extend inwardly the mating surface of the inner component abuts the projections and the mating surface of the outer component abuts the unformed regions.

Each projection of the tolerance ring acts as a spring and exerts a radial force against the mating components, thereby providing an interference fit between them. Rotation of the inner or outer component will produce similar rotation in the other component as torque is transmitted by the ring. Rotational slip will occur if the resultant torque between the components exceeds a threshold value. Likewise, linear movement of either component will produce similar linear movement in the outer component as linear force is transmitted by the ring as long as the resultant linear force is less than the initial slip force.

The tolerance ring may be constrained relative to the inner or outer component so that relative axial movement between the tolerance ring and that component is prevented in at least one axial direction.

In some embodiments, step (c) may include continuing movement of the inner or outer component, respectively, beyond the tolerance ring. That is, the movement may be continued until after the moving component protrudes beyond the tolerance ring.

In step (a) of the process the tolerance ring is preferably constrained in the outer component. In such embodiments it is the inner component which is moved relative to the constrained tolerance ring in step (b).

Step (d) may include measuring the force required at both steps (b) and (c). The measured force is typically the force required to move the moving component relative to the constrained tolerance ring at a constant speed. This may be the case where a pre-assembly of tolerance ring and shaft (or bore) is to be assembled with a bore (or shaft) by relative movement at a constant speed. Alternatively, the measured force may be the force required to move the moving component relative to the constrained tolerance ring according to a pre-determined variable speed profile. This may be appropriate where a pre-assembly of tolerance ring and shaft (or bore) is to be assembled with a bore (or shaft) by relative movement at a variable speed. For example, the moving component may travel at a first speed relative to the tolerance ring before encountering the projections and a second speed once it has encountered the projections and after it protrudes beyond them. The moving component is preferably moved along a predetermined distance during the measurement step.

The measured force data may be represented in the form of a graph and the remaining assembly force determined by analysis of the graph. For example, the portion of the graph representing the force data from step (c) may be interpreted by generating a best-fit line to determine the assembly force.

The linear movement of the plug or ring gauge in step (c) is preferably 0.1 mm or more. In preferred embodiments the inner component is a plug gauge and the outer component is a ring gauge.

In a second aspect, a method of process control includes the steps of:

(a) constraining a tolerance ring relative to one of an inner or outer component, the tolerance ring comprising an annular band of resilient material having a plurality of projections projecting radially therefrom;

(b) moving the other of the inner or outer component with respect to the constrained tolerance ring so as to compress the projections of the tolerance ring between the inner and outer components;

(c) continuing movement of the inner or outer component, respectively, beyond the tolerance ring; and (d) measuring a force required to achieve the continued movement at step (c).

In the prior method discussed above, the plug gauge is passed through a tolerance ring constrained within the ring gauge so that the leading edge, i.e. the advancing edge, of the ring contact surface travels from one side of the tolerance ring to the other, but no further. The maximum force (peak assembly force) required to achieve this movement is measured and is taken to be representative of the initial slip force.

In the method of the second aspect, however, the travel of the moving component is continued so that it extends beyond the tolerance ring (step (c)), and it is the force required to achieve this continued movement (step (d)) which is measured.

The measured force has been found to be approximately constant when the moving component has traveled beyond the tolerance ring, i.e. during the continued movement step. The method may include determining the assembly force by calculating an average, or best-fit, force from the force data. For example, the force data may be represented in the form of a graph and the assembly force determined from a best-fit line generated for the portion of the graph representing the force data from step (d). Alternatively, the method may include taking a single force measurement at step (d) and this force taken to be the assembly force.

After the moving component has traveled to the far side of the tolerance ring, it continues to travel so that it protrudes beyond the tolerance ring. As in the first aspect, by continued movement it is meant that the movement at step (c) is a continuation of movement of the component relative to the constrained tolerance ring. In step (c) of the second aspect, however, the movement is continued after the moving component has traveled through the tolerance ring so that the moving component leaves the confines of the tolerance ring, i.e. so that the moving component protrudes axially beyond an axial edge of the tolerance ring. The extent of travel of the moving component may be determined by the leading edge of the mating surface of that component. Thus, step (c) may include continuing movement of the inner or outer component, respectively, so that the leading edge of its mating surface protrudes beyond the tolerance ring. The mating surface of the moving component is the inner surface (outer component) or outer surface (inner component) which contacts the tolerance ring during compression of its projections.

The inner or outer component, respectively, may travel the entire axial extent of the tolerance ring in step (b), before the continued movement of step (c). Thus, the plug gauge may travel from one side of the tolerance ring to the other and beyond, all in one continuous movement.

The method of the second aspect may include the step of:

(e) using the force measured at step (d) for process control.

The optional or preferred features described above in relation to the first aspect are equally applicable to the second aspect. In particular, the process control of step (e) of the second aspect may have any of the features of the process control of step (e) of the first aspect, and the force measured at step (d) of the second aspect may be determined and/or analyzed as the force measured at step (d) of the first aspect.

In a third aspect, a method of manufacturing tolerance rings includes the steps of:

(a) manufacturing tolerance rings according to a manufacturing process, each tolerance ring comprising an annular band of resilient material having a plurality of projections projecting radially therefrom;

(b) selecting a sample manufactured tolerance ring from the tolerance rings manufactured in step (a);

(c) performing the process control method of the first or second aspects on the sample manufactured tolerance ring; and (d) if the measured force required to achieve the continued movement is outside of predetermined limits, modifying the manufacturing process.

The method may include iterating steps (b), (c) and (d) of the method until the measured force of a sampled tolerance ring is found to be within the predetermined limits.

Modification of the manufacturing process may include changing the nominal parameters of the manufactured tolerance rings. For example, it may include decreasing or increasing the nominal diameter of the manufactured tolerance rings, or increasing or decreasing the height of the projections.

Also proposed, in a fourth aspect, an apparatus for performing process control methods of the first and second aspects includes:

a plug gauge having an outermost mating surface;

a ring-supporting portion including a ring gauge having a bore with an innermost mating surface for constraining a tolerance ring, the plug gauge being receivable in the bore, and a base which supports the ring gauge and which has a cavity aligned with an end of the bore and sized to receive the plug gauge if it protrudes from the bore; and a force meter arranged to measure the force required to move the plug gauge through the bore of the ring gauge.

The apparatus differs from the known assembly force measurement apparatus discussed above in that the head of the plug gauge can emerge from the far side of the bore. This enables remaining assembly force—i.e. the force required to move the plug gauge once its head has emerged from the bore—to be measured.

The diameter of the mating surface of the plug gauge is smaller than the diameter of the mating surface of the bore such that between them they define an annular space. The width of the annular space in the radial direction is preferably smaller than the thickness in the radial direction of a tolerance ring before it is constrained within the annular space. The projections of a tolerance ring within that annular space may thus be compressed so that the tolerance ring resists relative axial movement between the plug gauge and bore.

The cavity in the base preferably has a depth of 0.1 mm or more, to enable the head of the plug gauge to protrude from the bore by at least 0.1 mm.

The force meter may be arranged to measure the force required to move the plug gauge so that it protrudes beyond the projections of a tolerance ring. Alternatively, or in addition, the force meter may be arranged to measure the force required to move the plug gauge so that it protrudes beyond the tolerance ring; that is, from a position in which its head has traveled the entire axial extent of the bore to a position in which the head has emerged from the bore. In this way, the force meter may be adapted to measure remaining assembly force.

The ring gauge and base of the ring-supporting portion are preferably separate members. This enables off-the-shelf ring gauges to be used, and also means that the ring gauge of the ring-supporting portion may be interchanged with ring gauges with different sized bores. The ring-supporting portion may alternatively be formed in one piece. If the ring gauge and base are separate members the base may have a recessed seat portion in which the ring gauge is seated. This seat portion may serve to align the cavity and bore.

The ring-supporting portion may include means for restricting axial movement of the tolerance ring relative to the bore during use. The means may include one or more members extending radially inwardly from the mating surface of the bore. The one or more members may project radially inwardly so as to extend beyond the mating surface of the bore but not as far as the mating surface of the plug gauge, in order to not restrict passage of the plug gauge into the cavity. The one or more members may include upstanding lip portions at their radially innermost edges, the lip portions being for locating the end of a tolerance ring.

For example, the ring-supporting portion may include a peripheral shelf or ledge within the bore. The ledge may support an end of the tolerance ring during use and thereby prevent axial movement in the direction of travel of the plug gauge. The ledge may extend around at least part of the circumference of the bore. It may extend all the way around the circumference of the bore. The ledge may have a circumferentially extending lip for locating the end of a tolerance ring on the ledge. The lip may project upwardly from the radially innermost edge of the ledge.

In embodiments in which the base and ring gauge of the ring-supporting portion are not integrally formed the base may include a cylindrical recess, a radially outer annular portion of the recess base forming a seat portion in which the ring gauge is seated and a radially inner annular portion of the recess base forming a circumferentially extending ledge for supporting a tolerance ring. The base may include an annular protrusion extending around the circumference of the inner diameter of the ledge and projecting from the recess base. In this way, the annular protrusion can serve to locate the end of a tolerance ring on the ledge. The recess and annular protrusion are preferably axially aligned with the cavity of the base.

Preferred or optional features described in relation to the above proposals may be applied, either singly or in combination, to any aspect of the disclosure.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
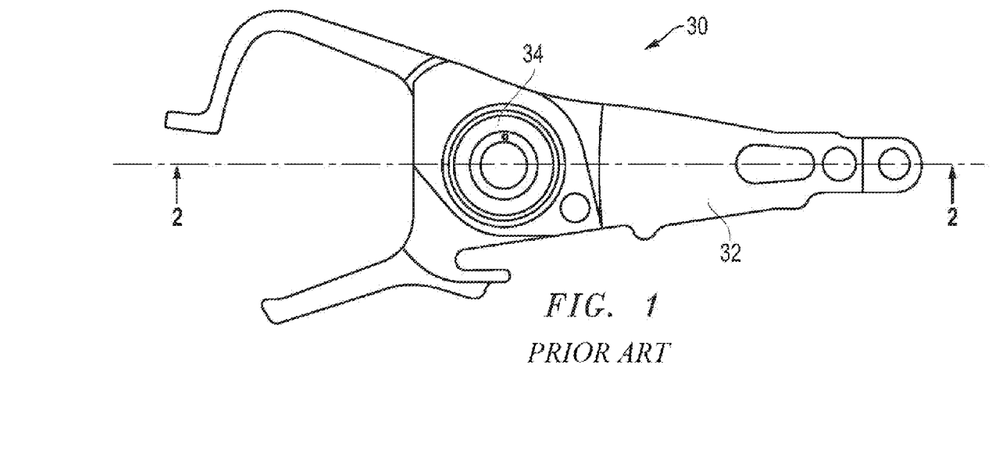
FIG. 1 shows a plan view of a conventional hard disk drive pivot mount which includes a tolerance ring.

FIG. 1 shows a known hard disk drive pivot mount 30, which comprises an arm 32 adapted to retain magnetic recording disks and pivot 34 which is rotatable on a bearing about a shaft. A tolerance ring (not shown in FIG. 1) provides an interference fit between the pivot 34 and the arm 32 such that the arm rotates with the pivot.

Figure 2:
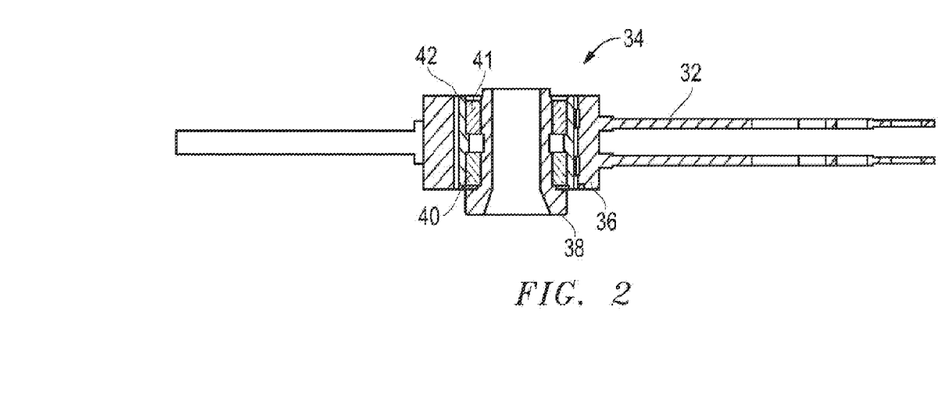
FIG. 2 shows a cross-section taken along the line 2-2 of the hard disk drive pivot mount shown in FIG. 1.

FIG. 2 shows a cross-section taken along the line 2-2 in FIG. 1. FIG. 2 shows that the arm 32 comprises a circumferential housing 36 which includes a bore in which the pivot 34 is received. The pivot 34 comprises a rotatable sleeve member 42 which is coupled to a shaft 38 via a pair of bearings 40, 41. FIG. 2 thus shows an example of a sleeved pivot; in other applications the pivot may not include a sleeve. The tolerance ring fits between the outer surface of the rotatable sleeve member 42 and the inner surface of the bore formed in the circumferential housing 36. This is shown in more detail in FIG. 3, where it can be seen that a tolerance ring 20 having waves, or ridges, 28 substantially aligned with bearings 40, 41 is compressed between the rotatable sleeve member 42 and circumferential housing 36. The tolerance ring 20 is formed from a rectangular strip, or band, of resilient material such as spring steel which has been rolled into an open ring shape or loop in which the free ends of the rolled strip may be separated by a gap or may overlap one another. The waves 28 are press-formed or roll-formed along the length of the strip. The tolerance ring 20 thus has unformed regions between neighboring waves 28 and (annular shaped) unformed regions between the waves 28 and the edge of the strip. The waves 28 project radially outwardly from the strip so that they contact the inner mating surface of the housing 36. Similarly, the unformed regions of the tolerance ring 20 contact the outer mating surface of the sleeve member 42.

Figure 3:
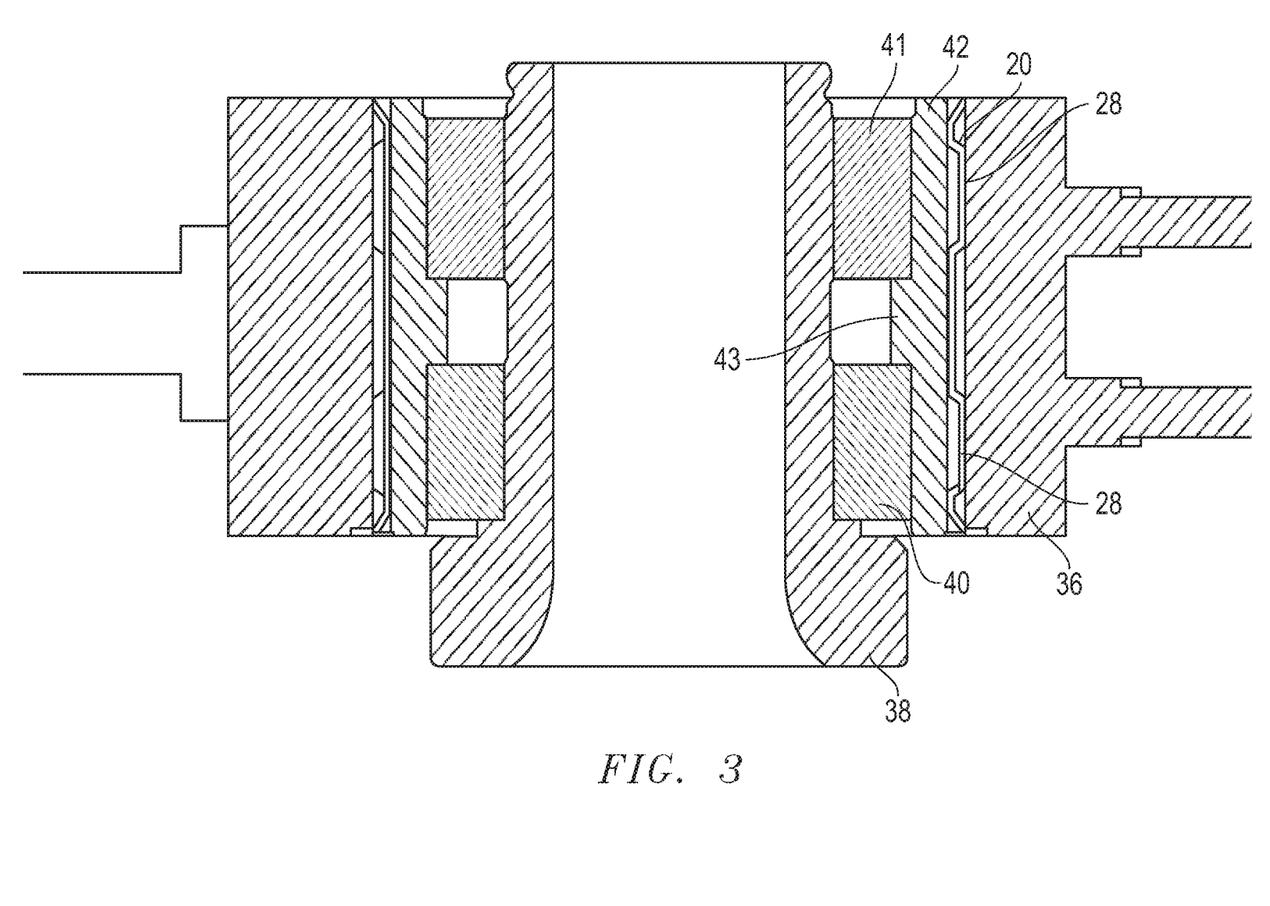
FIG. 3 shows a close-up of the coupling between the arm and sleeved pivot of the hard disk drive pivot mount shown in FIG. 1.

In FIG. 3 it can be seen that rotatable sleeve member 42 comprises an integral spacer element 43 which separates the bearings 40, 41.

Figure 4:
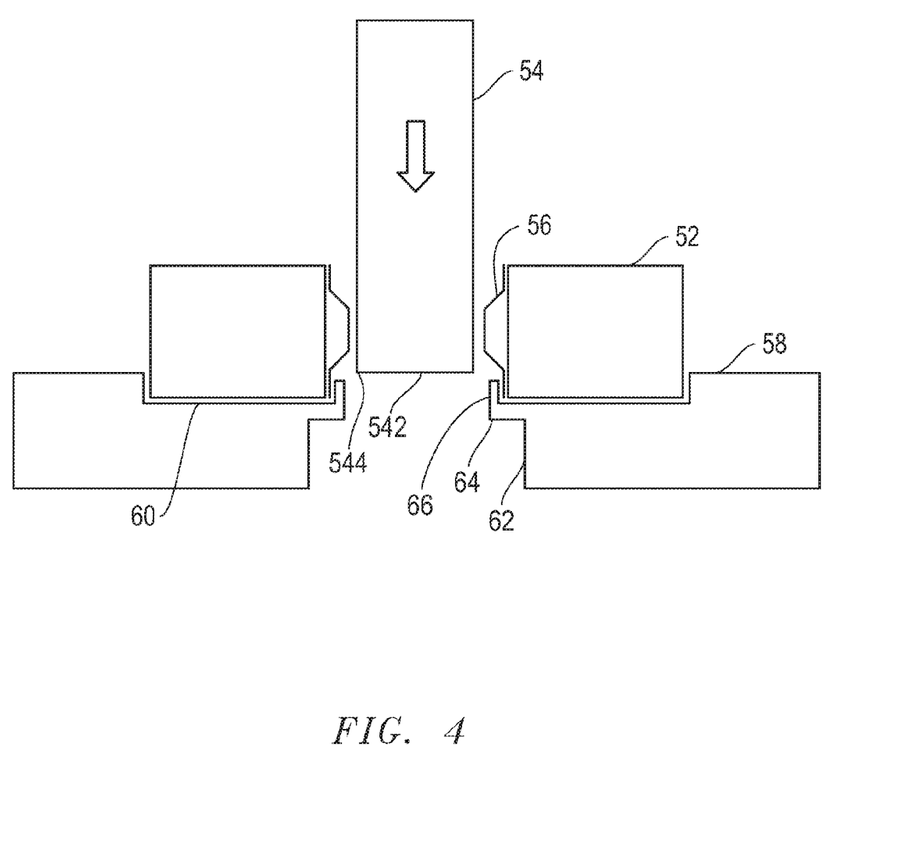
FIG. 4 shows apparatus according to an embodiment of the present disclosure.

FIG. 4 illustrates apparatus according to an embodiment which is suitable for determining whether tolerance rings such as that 20 illustrated in FIG. 3 will provide sufficient resistance to slip between the outer surface of the rotatable sleeve member 42 and the inner surface of the bore formed in the circumferential housing 36. The apparatus includes a ring gauge 52 and a plug gauge 54, between which a tolerance ring 56 is sandwiched to achieve an interference fit. The ring gauge 52 is mounted on a step platform 58 which is generally annular in shape. The platform 58 has a seat portion 60 which is an annular recess in the upper surface of the platform within which the ring gauge 52 is seated. The seat portion 60 supports the underside of the ring gauge 52 so that the internal bore of the ring gauge is aligned with a cylindrical cavity 62 in the platform 58 which serves to allow free passage of the plug gauge 54 through the platform 58. The platform 58 further includes a ledge 64 which runs around the periphery of the seat portion 60 and extends above the cavity 62. The ledge 64 supports an end face of the tolerance ring 56 to restrict axial movement of the tolerance ring 56 relative to the ring gauge 52 during use. In this embodiment, the ledge 64 is an extension of, i.e. coplanar with, the seat portion 60, and also includes a circumferential lip 66 which serves to locate the tolerance ring 56 and further constrain the tolerance ring 36 to prevent relative axial movement during the assembly process.

In use, a preassembly of the tolerance ring 56 constrained within the internal bore of the ring gauge 52 is formed. The preassembly is located on the platform 58 so that the ring gauge 52 is seated within the seat portion 60 the tolerance ring 56 rests on the ledge 64 as shown in FIG. 4. The plug gauge 54 is then moved vertically (as indicated in FIG. 4) so that its leading face 542 (and also the leading edge 544 of the plug gauge's mating surface) travels the entire axial extent of the tolerance ring 56 and emerges from the tolerance ring. A force meter (not shown) is used to measure the axial force required to move the plug gauge 54. This measured force is known as assembly force. In this embodiment the assembly force is determined by moving the plug gauge 54 at a constant speed and along a predetermined distance relative to the constrained tolerance ring 56. This mimics the real process of assembling a tolerance ring between hard disk drive pivot and arm. In other embodiments the assembly may be carried out at a variable speed, and the plug gauge (or ring gauge) may be moved according to a corresponding speed profile. The results presented in the present application were obtained using a MECMESIN Emperor Multitest 1i force meter with a 1000N load cell.

Figure 5:
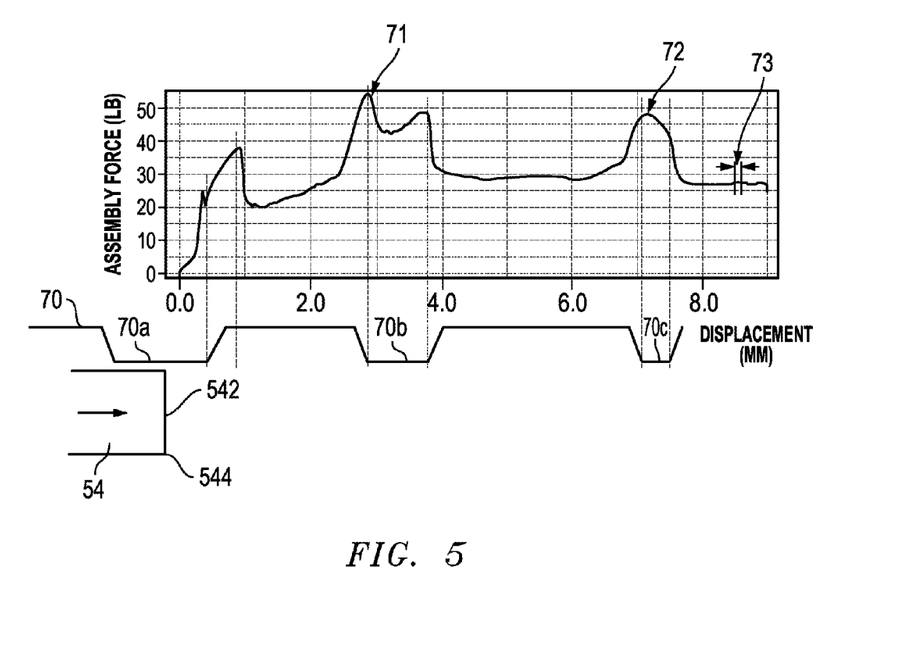
FIG. 5 shows a graph of assembly force (in imperial pounds (lb)) plotted against displacement (in mm) of the plug gauge of FIG. 4 and a corresponding cross-sectional view showing how the displacement corresponds to the position of the leading edge of the plug gauge relative to a tolerance ring constrained within the ring gauge of FIG. 4.

The graph of FIG. 5 shows the variation of assembly force with the distance traveled by the head of the plug gauge 54. The corresponding partial cross-sectional view shows how distance along the horizontal axis of the graph corresponds to the position of the head 542, 544 of the plug gauge 54 relative to a constrained tolerance ring 70 having three rows of projections 70a, 70b and 70c.

The plug gauge 54 was initially positioned within the tolerance ring 70 as indicated in FIG. 5, i.e. so that its head 542, 544 was mid-way across the first row of projections 70a. The plug gauge was then moved at a constant speed from left to right (as shown in FIG. 5) until its head 542, 544 protruded from the tolerance ring 70. The peaks indicated at 71 and 72 represent the impulse forces experienced when the head of the plug gauge encountered the leading edges of the second 70b and third 70c rows of projections, respectively.

The prior method (discussed above) of determining initial slip force relies on the maximum peak assembly force, i.e. the force indicated at the pinnacle of the peak indicated at 71 in this example. It has been found that the assembly force can become substantially constant once the head of the plug gauge has passed beyond the projections of the tolerance ring, and its movement is no longer affected by factors related to the interaction between the head of the plug gauge and those projections such as elastic deformation, plastic deformation, roughness and out-of-shape (mis-alignment) effects. They have also established that the assembly force remains constant when the head of the plug gauge protrudes from the tolerance ring. In the present embodiment this force, known as the remaining assembly force, is measured at the substantially flat region of the graph indicated at 73. This is achieved by interrogating the force measurements taken at displacements between 8.5 mm and 8.6 mm. However, it can be seen from FIG. 5 that the assembly force becomes substantially constant after the head of the plug gauge protrudes beyond the third and final row of projections 70c, and that the remaining assembly force could therefore be measured at any displacement position from the end of the final row of projections onwards, including any displacement position from the end of the tolerance ring onwards. It can also be seen from FIG. 5 that the maximum peak indicated at 71 is in the region of 50% higher than the remaining assembly force.

Figure 6:
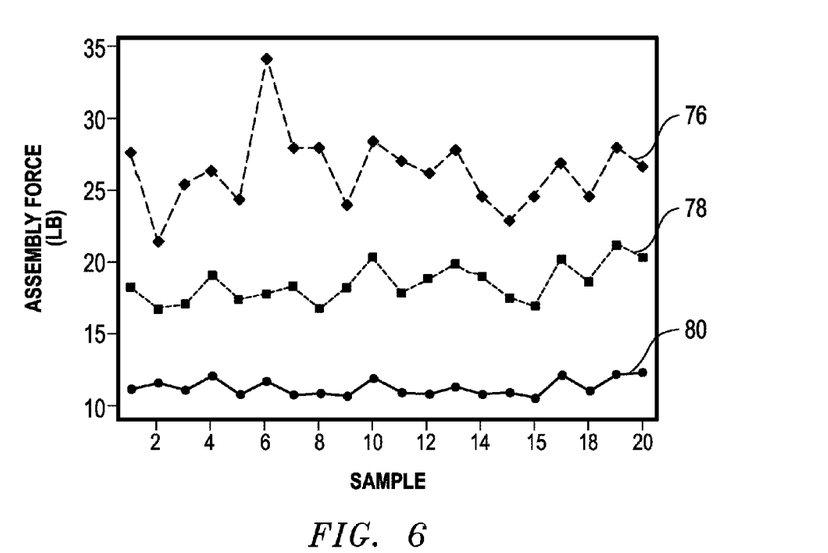
FIG. 6 shows a direct comparison of remaining assembly force, peak assembly force, and initial slip force for twenty tolerance ring samples.

FIG. 6 shows a comparison of peak assembly force (indicated at 76) and remaining assembly force (indicated at 78) with measured initial slip force (indicated at 80), for twenty tolerance ring samples. The results show that there is a far stronger correlation between remaining assembly force and initial slip force than there is between peak assembly force and initial slip force. For example, sample 6 was found to exhibit a peak assembly force which was much higher than the other samples, but the initial slip force and remaining assembly force were found to be within normal margins.

Figure 7:
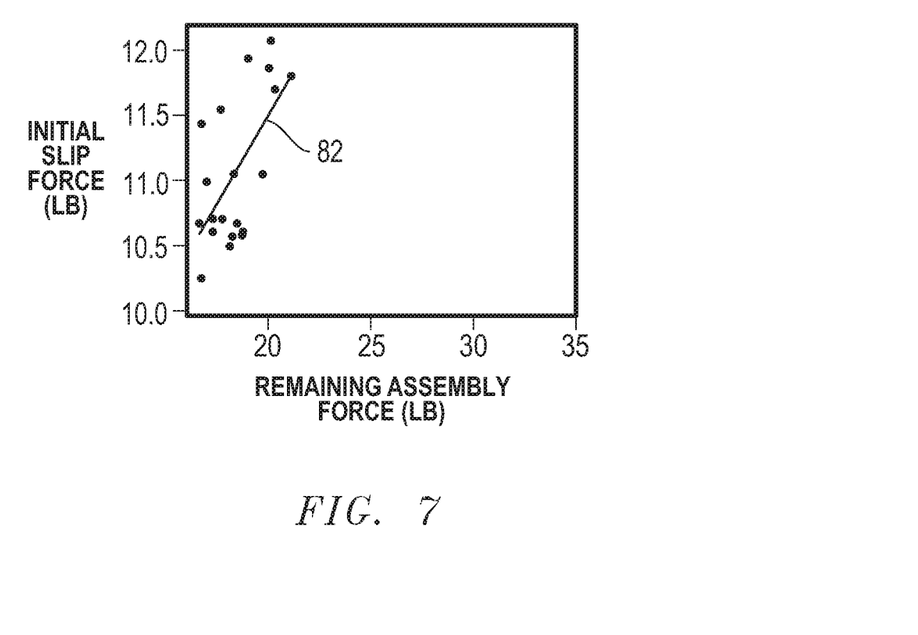
FIG. 7 shows a graph of initial slip force plotted against remaining assembly force.
Figure 8:
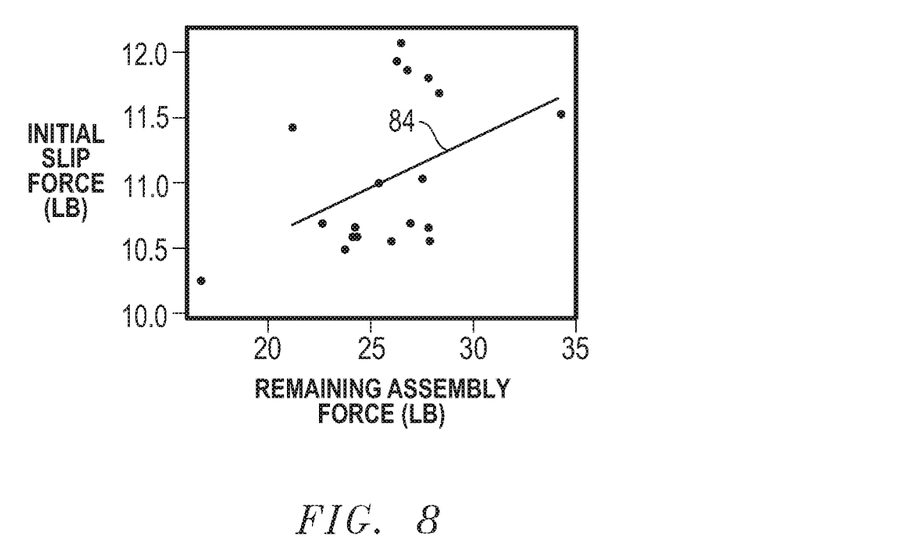
FIG. 8 shows a graph of initial slip force plotted against peak assembly force.

FIGS. 7 and 8 further demonstrate that the correlation between remaining assembly force and initial slip force is stronger than that between peak assembly force and initial slip. In FIG. 7, showing initial slip force plotted against remaining assembly force, the data points are clustered around the best-fit line 82, indicating a fairly strong proportional relationship. On the other hand, FIG. 8, which shows initial slip force plotted against peak assembly force, the data points are scattered quite widely about the best-fit line 84, indicating only a weak relationship.

Figure 9A:
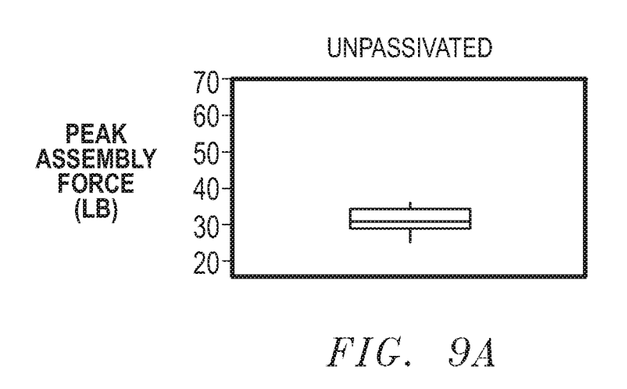
FIGS. 9A-9D show the distribution of measured peak (9A and 9B) and remaining (9C and 9D) assembly forces, respectively, for passivated (9B and 9D) and unpassivated (9A and 9C) tolerance rings.
Figure 9B:
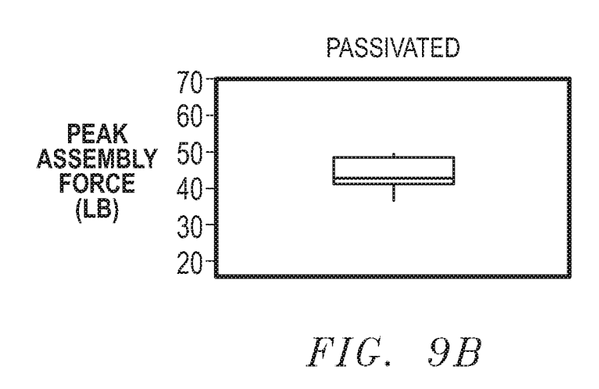

FIGS. 9A-9D show tolerance bars indicating the variation of the assembly forces measured for a number of samples of tolerance rings. The bars show that the average value for the peak assembly force (FIGS. 9A and 9B) and the amount by which it may vary is different depending on whether the tolerance rings have been passivated (FIG. 9B) or have not been passivated (FIG. 9A). As discussed above, this difference is undesirable since it is preferable to test tolerance rings before they are passivated (to ensure that the manufacturing process can be adjusted as soon as possible after an out-of-process (outside of control limits) tolerance ring is discovered) but also important to ensure that the measured assembly force is representative of the assembly force exhibited after passivation.

Figure 9C:
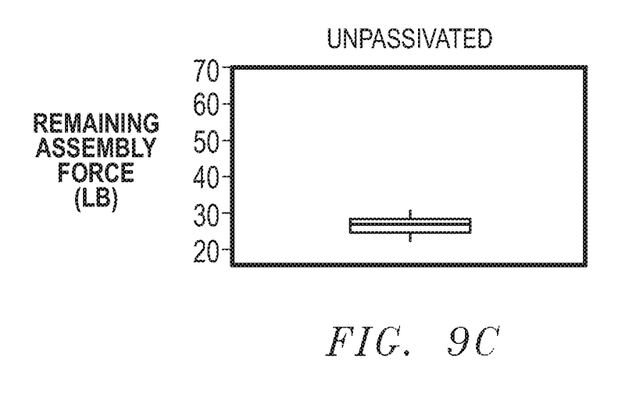
Figure 9D:
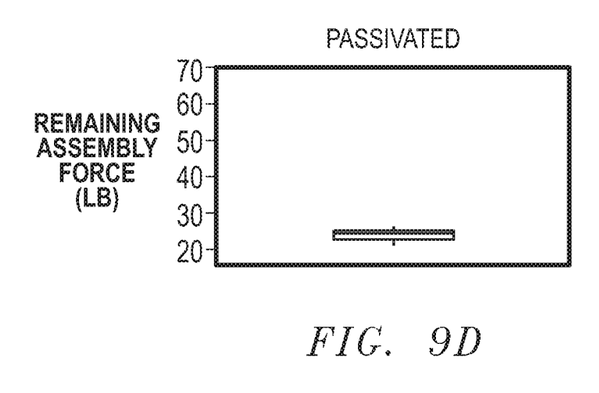

FIGS. 9C and 9D show that remaining assembly force is not affected by passivation to the same extent as peak assembly force. Not only is the average value for remaining assembly force approximately the same before (FIG. 9C) and after (FIG. 9D) passivation, but the degree of variation is not increased.

In applying the process control method to sample sets of tolerance rings from two different manufacturing processes, the inventors have found remaining assembly forces to be well within the predetermined upper and lower specification limits.

In a first sample set the mean and median average values for assembly force were centered around the mid-point between the upper and lower specification limits, but the assembly force data was not evenly distributed about a standard normal distribution as one would wish. This distribution resulted in a relatively low value for Ppk (Process Performance Index, which provides a measure of how well the process has performed based on the given data sample), 1.78, but a high value for Cpk (Process Capability Index, which provides a measure of how well the process is performing, and will continue to perform, relative to its targets), 2.44, indicated that this nonstandard distribution would not be replicated in future sampled data and thus that the process was well controlled.

In a second sample set the remaining assembly force data was well distributed about the mean and median averages, but these averages were skewed towards the lower specification limit. This resulted in relatively low values for Cpk, 1.42, and Ppk, 1.11, but the fact that these values are similar in magnitude indicates that the process is in control, but that adjustment is needed to align the average performance with the target (i.e. the mid-point between the upper and lower specification limits).

What is claimed is:

1. A method of process control comprising:
   (a) constraining a tolerance ring relative to one of an inner and an outer component, the outer component comprising a circumferential housing of a reading arm for hard disks, the tolerance ring comprising an annular band of resilient material having a plurality of projections projecting radially therefrom;
   (b) moving the other of the inner or outer component axially with respect to the constrained tolerance ring so as to compress the projections of the tolerance ring between the inner and outer components;
   (c) continuing movement of the inner or outer component, respectively, beyond an axial edge of the tolerance ring in a direction of travel of the inner component or outer component;
   (d) measuring a remaining assembly force required to achieve the continued movement at step (c); and
   (e) using the remaining assembly force measured at step (d) for process control,
      wherein (e) further includes
      (e') determining an initial slip force from the measured remaining assembly force by using a best-fit line of a predetermined correlation between remaining assembly force and initial slip force.

2. A method according to claim 1, further comprising:
   (d') repeating steps (a) to (d) for each of a plurality of sample tolerance rings,
   wherein step (e) includes using the remaining assembly forces measured at step (d) for each of the sample tolerance rings for process control.

3. A method according to claim 2, wherein step (e) includes performing statistical analysis on the remaining assembly forces measured at step (d) for each of the sample tolerance rings.

4. A method according to claim 3, wherein step (e) includes compiling a process control chart including the remaining assembly forces measured at step (d) for each of the sample tolerance rings.

5. A method according to claim 1, wherein the remaining assembly force measured at step (d) is a force required to achieve the continued movement of step (c) at a constant speed.

6. A method according to claim 1, wherein the inner or outer component moved at step (b) includes a mating surface that contacts and slips relative to the tolerance ring during that movement, and wherein step (c) includes continuing movement of the inner or outer component, respectively, so that the leading edge of the mating surface protrudes beyond the projections in the direction of travel of the inner or outer component.

7. A method of process control including the steps of:
   (a) constraining a tolerance ring relative to one of an inner or outer component, the outer component comprising a circumferential housing of a reading arm for hard disks, the tolerance ring comprising an annular band of resilient material having a plurality of projections projecting radially therefrom;
   (b) moving the other of the inner or outer component axially with respect to the constrained tolerance ring so as to compress the projections of the tolerance ring between the inner and outer components;
   (c) continuing movement of the inner or outer component, respectively, beyond an axial edge of the tolerance ring in a direction of travel of the inner or outer component; and
   (d) measuring a remaining assembly force required for continuing movement; and
   e) using the remaining assembly force measured at step (d) for process control, wherein
      (e) further includes
      (e') determining an initial slip force from the measured remaining assembly force by using an average from the remaining assembly forces measured in step (d).

\* \* \* \* \*